(12) United States Patent
Kitami et al.

(10) Patent No.: US 8,184,017 B2
(45) Date of Patent: May 22, 2012

(54) PROCESSING METHOD IN OPERATION SYSTEM, FLOW RATE CONVERTER, AND CORIOLIS FLOW METER

(75) Inventors: Hirokazu Kitami, Tokyo (JP); Shunji Saitoh, Tokyo (JP); Hideki Shimada, Tokyo (JP)

(73) Assignee: Oval Corporation, Tokyo (JP)

( * ) Notice: Subject to any disclaimer, the term of this patent is extended or adjusted under 35 U.S.C. 154(b) by 700 days.

(21) Appl. No.: 12/227,898

(22) PCT Filed: Jun. 21, 2007

(86) PCT No.: PCT/JP2007/062950
§ 371 (c)(1),
(2), (4) Date: Dec. 2, 2008

(87) PCT Pub. No.: WO2008/013023
PCT Pub. Date: Jan. 31, 2008

(65) Prior Publication Data
US 2009/0289810 A1    Nov. 26, 2009

(30) Foreign Application Priority Data
Jul. 24, 2006    (JP) .................................. 2006-200249

(51) Int. Cl.
*G08C 19/16*    (2006.01)
(52) U.S. Cl. .................................................. 340/870.25
(58) Field of Classification Search ............ 340/870.02, 340/870.24
See application file for complete search history.

(56) References Cited

U.S. PATENT DOCUMENTS 6,917,887 B2 *   7/2005   Henry et al. ..................... 702/45
6,928,569 B2 *   8/2005   Rahman ........................ 713/400

FOREIGN PATENT DOCUMENTS

| JP | 64-1321 | 1/1989 |
|----|---------|--------|
| JP | 2-66410 | 3/1990 |
| JP | 3-73034 | 11/1991 |
| JP | 3124990 | 10/2000 |
| JP | 2002-133572 | 5/2002 |
| JP | 2004-93467 | 3/2004 |

OTHER PUBLICATIONS

International Search Report mailed Aug. 14, 2007 for International Application No. PCT/JP2007/062950.

* cited by examiner

*Primary Examiner* — Michael Rutland Wallis
(74) *Attorney, Agent, or Firm* — Wenderoth, Lind & Ponack, L.L.P.

(57) ABSTRACT

A processing method for an operation system which performs operation processing in accordance with a detection amount detected by detection means and pulse output processing in which an operation result from the operation processing is transmitted as a pulse output, including: controlling transmission of the pulse output performed in the pulse output processing to make the transmission of the pulse output asynchronous with a timing of an end of the operation processing; and transmitting, by repeating the controlling, a pulse train having time-series continuity.

15 Claims, 15 Drawing Sheets

PRIOR ART

PROCESSING METHOD IN OPERATION SYSTEM, FLOW RATE CONVERTER, AND CORIOLIS FLOW METER

BACKGROUND OF THE INVENTION

I. Technical Field

The present invention relates to a processing method for an operation system, and more particularly, to a processing method which enables an operation system to perform processing of transmitting pulse outputs as a pulse train having time-series continuity. In addition, the present invention relates to a flow rate converter, which adopts the processing method for an operation system, and a Coriolis flowmeter provided with the flow rate converter.

II. Description of the Related Art

For example, as a technology relating to pulse signal output processing performed by a converter of a Coriolis flowmeter, there is known a technology disclosed in JP 2002-133572 A by the applicant of the present invention.

In JP 2002-133572 A, the Coriolis flowmeter includes a flowmeter body and a converter. A detection value from the flowmeter body is input to the converter. When the detection value is input to the converter, a microprocessor performs operation processing and other processing in the converter, and then, a pulse signal is output. In a downstream device, which receives the pulse signal from the Coriolis flowmeter (from converter), a pulse number per unit time is counted, thereby determining an instantaneous mass flow rate value. Further, in the downstream device, a total amount of mass flow rates can be determined by multiplying the pulse numbers together.

With regard to the pulse signals which are output from the converter, there is disclosed, in JP 2002-133572 A, a fact that a pulse output quiescent state inevitably occurs. In addition, in JP 2002-133572 A, there is also disclosed a fact that, when a pulse period is extended in an attempt to narrow time intervals of the pulse output quiescent state, a pulse output zero state in which some of the calculated pulses cannot be output during a fixed period occurs conversely. On the other hand, with regard to the downstream device, there is disclosed a fear that, if the pulse output quiescent state occurs in the pulse signal from the converter when the instantaneous flow rate value is output by counting the pulse number per unit time, the counted value does not indicate an accurate flow rate depending on how the unit time is set.

An object of the invention disclosed in JP 2002-133572 A is to propose a technology in which, after pulses corresponding to the pulse number calculated in the converter have been all output, a pulse quiescent time before the next fixed period is made as small as possible.

SUMMARY OF THE INVENTION

Incidentally, with regard to output of the pulse signal, the applicant of the present invention has conceived another technology which uses a different method from that of the technology disclosed in JP 2002-133572 A by the applicant of the present invention. Hereinbelow, a description is made of this technology which uses a different method according to the applicant of the present invention. In addition, a description is also made of an accompanying problem.

Referring to FIG. 15(a), there is illustrated an example of a configuration of an operation system which is related to output of pulse signals and used for a Coriolis flowmeter. The flow rate operation system of a converter 3 includes two CPUs, which are an upper operation means (CPU) 1 and a lower operation means (CPU) 2. In the upper operation means 1, flow rate operation is performed in response to an input of a detection value from a flowmeter body 4. Further, in the upper operation means 1, a result of the flow rate operation is output to the lower operation means 2 as flow rate data. In the lower operation means 2, operation for converting the flow rate data into a pulse signal is performed, and, immediately after this operation, the pulse signal obtained by conversion is output to a downstream device 5. Note that the reason why two CPUs are used is to improve the overall processing speed by reducing an operation processing load on the upper operation means 1.

In FIG. 15(b), periods of the upper operation means 1 and the lower operation means 2 are set to be the same, for example, 100 ms. Specifically, when it is assumed that the upper operation means 1 has a fixed period of 100 ms, setting of the lower operation means 2 for this fixed period of 100 ms is made as follows. With a timing at which the upper operation means 1 is ended serving as a trigger, the lower operation means 2 takes 2 ms of a quiescent time, and then outputs a pulse signal in the remaining 98 ms (With the end of a fixed period of 100 ms of the upper operation means 1, which is denoted by (1), serving as the trigger, the lower operation means 2 takes a quiescent time of 2 ms denoted by (2), and then outputs a pulse signal in remaining 98 ms denoted by (3). This processing is repeated. With the end of a fixed period of 100 ms denoted by (4) serving as the trigger, a quiescent time of 2 ms denoted by (5) is taken, and then, a pulse signal is output in remaining 98 ms denoted by (6) . . . ). The periods of the upper operation means 1 and the lower operation means 2 are 100 ms and are in synchronization with each other.

The quiescent time of 2 ms is necessary for performing the operation processing of converting the flow rate data into the pulse number (pulse frequency) per fixed unit time, and is a time slot during which the pulse output is not performed. In addition, the quiescent time of 2 ms is also a time slot for performing operation processing associated with another load which uses the end of the upper operation means 1 as the trigger. Particularly, most of the quiescent time of 2 ms is taken as the time slot for performing the operation processing associated with another load. For this reason, if the quiescent time of 2 ms is not set, this means that the operation processing associated with another load and the output of the pulse signal cannot be performed.

By setting the quiescent time of 2 ms, the pulse signals are output intermittently. By setting the quiescent time of 2 ms, the pulse output quiescent state occurs in the pulse signal which is output from the converter 3. The problem is that, in a case of a batch measurement, particularly, a short-batch measurement performed in a short period of time, there is a high possibility that such a pulse output quiescent state as a quiescent time of 2 ms cannot be ignored.

The present invention has an object to provide, as a processing method which is not affected even in a short-batch measurement, a processing method for an operation system. In addition, the present invention has another object to provide a flow rate converter and a Coriolis flowmeter.

In order to solve the above-mentioned problem, according to a first aspect of the present invention, a processing method for an operation system which performs operation processing in accordance with a detection amount detected by detection means and pulse output processing in which an operation result from the operation processing is transmitted as a pulse output includes: controlling transmission of the pulse output performed in the pulse output processing to make the transmission of the pulse output asynchronous with a timing of an end of the operation processing; and transmitting, by repeating the controlling, a pulse train having time-series continuity.

According to a second aspect of the present invention, the processing method for an operation system according to a first aspect of the present invention further includes: comparing an operation period of the operation processing and a pulse output transmission time of the pulse output processing, which is associated with the operation period; and setting, in accordance with a result of the comparing, a next pulse output transmission time.

According to a third aspect of the present invention, in the processing method for an operation system according to a second aspect of the present invention, when the pulse output transmission time is larger than the operation period associated therewith as the result of the comparing, the next pulse output transmission time is set to be a time determined by subtracting θ% of the operation period from the operation period; and when the pulse output transmission time is smaller than the operation period associated therewith as the result of the comparing, the next pulse output transmission time is set to be a time determined by adding θ% of the operation period to the operation period.

According to a fourth aspect of the present invention, the processing method for an operation system according to a first aspect of the present invention further includes: generating upper timer interrupts in synchronization with an operation period of the operation processing; generating, instead of using the operation period, lower timer interrupts at intervals of 1/n of the operation period, n being an integer equal to or larger than 2; and setting, in accordance with a number of generations of the lower timer interrupts after generation of one of the upper timer interrupts, a next pulse output transmission time in the pulse output processing.

According to a fifth aspect of the present invention, in the processing method for an operation system according to a fourth aspect of the present invention, when the number of generations of the lower timer interrupts is larger than a predetermined integer, the next pulse output transmission time is set to be a time determined by subtracting θ% of the operation period from the operation period; and when the number of generations of the lower timer interrupts is smaller than the predetermined integer, the next pulse output transmission time is set to be a time determined by adding θ% of the operation period to the operation period.

According to a sixth aspect of the present invention, in the processing method for an operation system according to any one of aspects one through five of the present invention, the operation processing and the pulse output processing are performed separately by using two processing devices.

According to a seventh aspect of the present invention, a flow rate converter adopts, as a processing method for a flow rate operation system, the processing method for an operation system according to any one of aspects one through six of the present invention.

According to an eighth aspect of the present invention, a Coriolis flowmeter is provided with the flow rate converter according to a seventh aspect of the present invention.

According to the present invention having those features described above, pulse signals which are output through the pulse output processing are transmitted as a pulse train having time-series continuity. If the outputs of the pulse signals are transmitted continuously without containing any intermittent period, it becomes possible to perform a period measurement and a short-batch measurement. According to the present invention, in the downstream device, errors in counting the number of outputs of the pulse signals do not occur, thereby obtaining accurate outputs.

According to the present invention, there is achieved an effect that a far better method compared with conventional ones can be provided as to the processing method for an operation system. In addition, according to the present invention, there is achieved another effect that the flow rate converter and the Coriolis flowmeter, which adopt this better method, can be provided.

DETAILED DESCRIPTION OF THE INVENTION

Hereinbelow, a description is made with reference to the drawings. In the description herein, a Coriolis flowmeter is taken as an example of a device provided with an operation system (the device is not limited to the Coriolis flowmeter).

Figure 1:
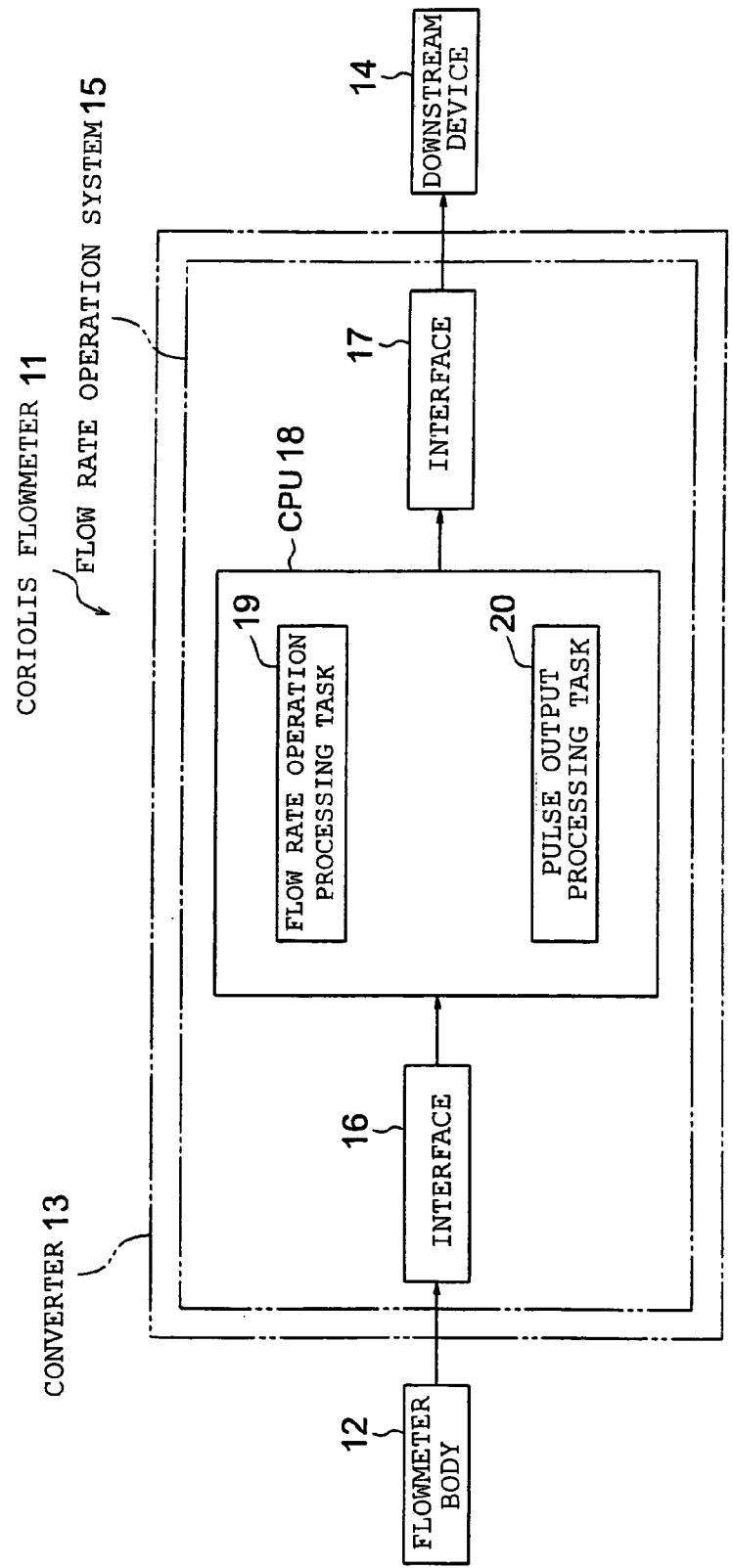
FIG. 1 is a configuration diagram illustrating an output processing method for a converter according to an embodiment of the present invention.
Figure 2:
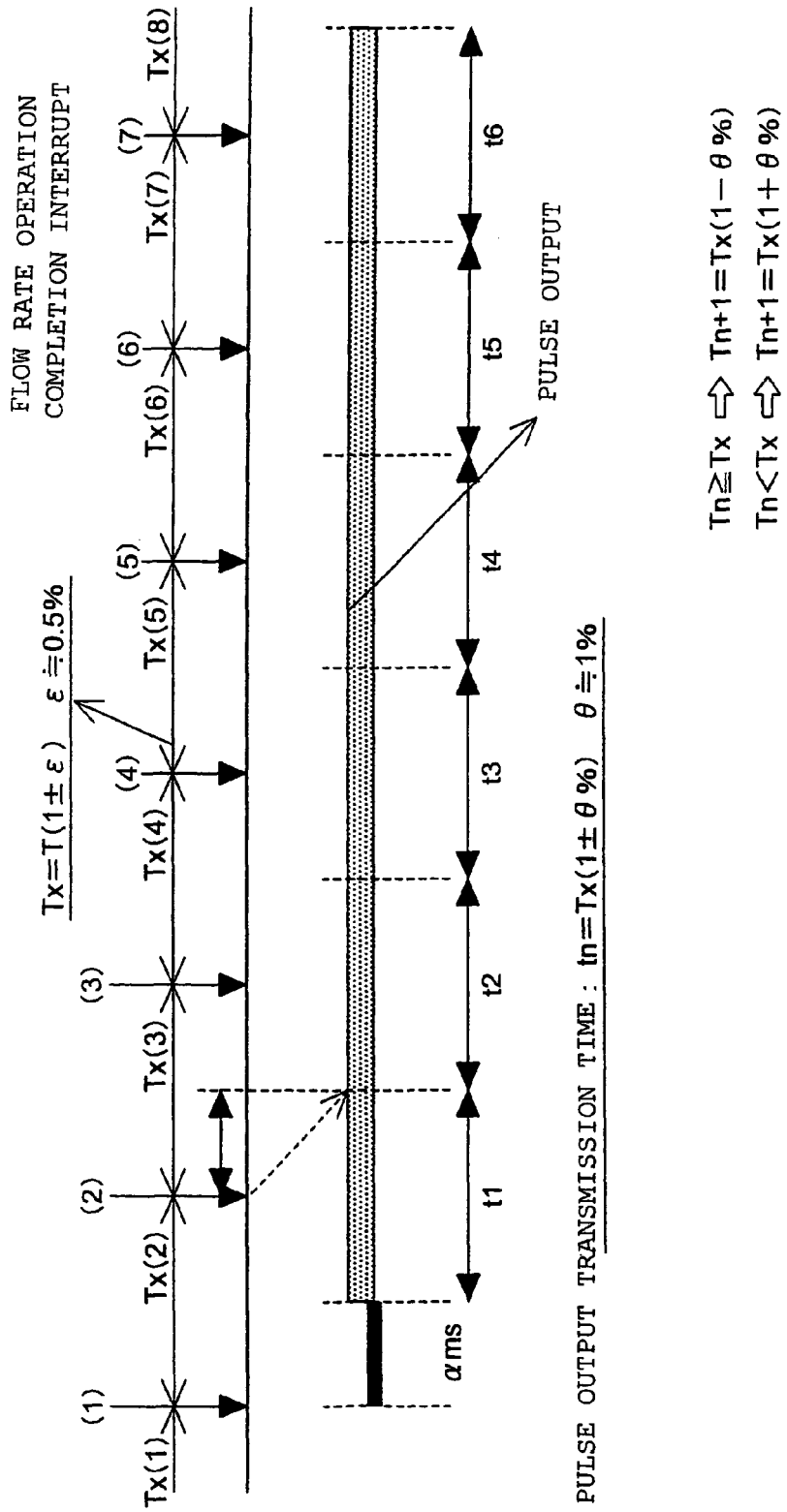
FIG. 2 is a control explanatory diagram illustrating control of a flow rate operation system.

FIG. 1 is a configuration diagram illustrating a processing method for an operation system according to an embodiment (first embodiment) of the present invention. Further, FIG. 2 is a control explanatory diagram illustrating control of a flow rate operation system.

Referring to FIG. 1, a Coriolis flowmeter 11 includes a flowmeter body 12, which is publicly well-known, and a converter 13, which is related to the present invention. The Coriolis flowmeter 11 is connected to a downstream device 14 via the converter 13, and is configured to output/transmit a pulse signal to the downstream device 14. Note that, in a case where the downstream device 14 is, for example, a display device, the downstream device 14 as the display device may be included in the configuration of the Coriolis flowmeter 11 by integrating into the converter 13.

The converter 13 includes a flow rate operation system 15 (with regard to other configurations which have general functions, illustrations and descriptions thereof are omitted). The flow rate operation system 15 has functions of a microcomputer, and includes (but is not limited thereto) interfaces 16 and 17 and a CPU 18. The flowmeter body 12 is connected to the interface 16. On the other hand, the downstream device 14 is connected to the interface 17.

The CPU 18 is so configured that a detection value (detection amount) from the flowmeter body (detection means) 12 is input via the interface 16. The CPU 18 is provided as a portion responsible for operation, control, and judgment. In the CPU 18, processing shifts from a flow rate operation processing (operation processing) task 19 to a pulse output processing task 20. To give a more specific description, the CPU 18 performs the flow rate operation processing task 19 in accordance with an input detection value, and then performs the pulse output processing task 20, in which a result of the operation made in the flow rate operation processing task 19 is transmitted as a pulse output to the downstream device 14 via the interface 17.

With regard to this control, the CPU 18 is so configured that the transmission of the pulse output from the pulse output processing task 20 is asynchronous with a timing at which the flow rate operation processing task 19 is ended. Accordingly, by repeatedly performing such control, a pulse train having time-series continuity is transmitted to the downstream device 14.

According to the present invention, by setting the transmission of the pulse output from the pulse output processing task 20 to be asynchronous with the timing at which the flow rate operation processing task 19 is ended, there is provided a feature (not shown) which actively separates a time slot during which operation processing associated with another load is performed with the end of the flow rate operation processing task 19 as a trigger from a time slot during which the transmission of the pulse output is performed in the pulse output processing task 20.

Hereinbelow, with regard to shifting of the processing from the flow rate operation processing task 19 to the pulse output processing task 20, and also with regard to transmission of the pulse train having time-series continuity, a description is made with reference to FIG. 2 (FIG. 1 is also referred to as necessary).

In FIG. 2, a plurality of downward arrows each indicates generation of a timer interrupt. Those downward arrows indicating generations of timer interrupts indicate that flow rate operation has been completed in the flow rate operation processing task 19. In other words, it is indicated that, every time the flow rate operation is completed, a timer interrupt is generated. The timer interrupt serves as a flow rate operation completion interrupt.

A generation period for the timer interrupt corresponds to a flow rate operation period in the flow rate operation processing task 19. In FIG. 2, the flow rate operation period is denoted by Tx. The flow rate operation period Tx is defined by an expression having such a relation as $Tx=T(1\pm\epsilon)$. In this expression, T denotes a reference period, and $\epsilon$ denotes a periodic variation. Here, it is assumed that the reference period T is set to, for example, 100 ms whereas the periodic variation $\epsilon$ is set as, for example, $\epsilon\approx0.5\%$ (this is one example. Smaller $\epsilon$ is more preferable).

The timer interrupt is generated after the flow rate operation system 15 is powered ON and initialization of the system is completed. In FIG. 2, "(1)" specifying one of the timer interrupt arrows indicates a timer interrupt which is generated for the first time after the initialization, that is, a first-time timer interrupt. Further, a timer interrupt specified by "(2)" indicates a second-time timer interrupt which is generated after the flow rate operation period Tx has elapsed. Similarly, "(3)" indicates a third-time timer interrupt, . . . , "(7)" indicates a seventh-time timer interrupt, and so on.

In addition to that, Tx(1) of FIG. 2 indicates a first-time flow rate operation period, which is the first period after the initialization of the system. Further, Tx(2) indicates a second-time flow rate operation period, Tx(3) indicates a third-time flow rate operation period, . . . . Here, an operation result (Qm) obtained through flow rate operation performed during the first-time flow rate operation period Tx(1) is a result obtained immediately after the initialization of the system, and hence it is assumed, for the sake of convenience, that an unstable operation result is contained therein (in actuality, the result is not necessarily unstable. The assumption is made only for the sake of convenience). It is assumed that the operation result becomes stable without fail before the second-time flow rate operation period Tx(2). The flow rate operation period Tx and generation of the timer interrupt are repeated until the Coriolis flowmeter 11 is powered OFF.

In the flow rate operation system 15, after the flow rate operation system 15 is powered ON and the initialization of the system is completed, the flow rate operation is performed in the flow rate operation processing task 19 in accordance with an input of a detection value from the flowmeter body 12. First, the flow rate operation is performed during the first-time flow rate operation period Tx(1), and, upon the completion of this operation, the first-time timer interrupt (1) is generated. On this occasion, the operation result from the flow rate operation processing task 19 is not immediately transmitted as the pulse output to the downstream device 14 in the pulse output processing task 20. Instead, the operation result is transmitted as the pulse output $\alpha$ms after the first-time timer interrupt (1). A pulse signal which is output after $\alpha$ ms has elapsed is a first-time pulse output, and is transmitted during a pulse output transmission time t1 (the pulse output transmission time is described later).

As can be seen from the description, the pulse signal is output/transmitted in asynchronization with the timer interrupt. In other words, the pulse output is transmitted through such control as to make the pulse output asynchronous with the timing of the end of the flow rate operation.

Upon the generation of the first-time timer interrupt (1), the second-time flow rate operation period Tx(2) starts. The flow rate operation is performed in the flow rate operation processing task 19. When the flow rate operation during the second-time flow rate operation period Tx(2) is completed, the second-time timer interrupt (2) is generated. At this stage, the pulse output which is transmitted during the pulse output transmission time t1 as described above has not been completed yet because the pulse output is delayed by $\alpha$ ms from the generation of the first-time timer interrupt (1). Accordingly, the operation result of the flow rate operation during the second-time flow rate operation period Tx(2) is temporarily stored in the storing section (not shown) of the CPU 18. The storing of the operation result is performed in the pulse output processing task 20 after the second-time timer interrupt (2) is generated.

Upon the end of the first-time pulse output which is transmitted during the pulse output transmission time t1, the operation result of the flow rate operation during the second-time flow rate operation period Tx(2), which is temporarily stored as described above, is converted into a pulse signal in the pulse output processing task 20, and is transmitted as a second-time pulse output. The second-time pulse output is transmitted during a pulse output transmission time t2. The second-time pulse output has been in a waiting state for pulse output transmission, and hence the second-time pulse output is transmitted immediately after the completion of the transmission of the first-time pulse output. The second-time pulse output is transmitted continuously without containing any intermittent period with respect to the first-time pulse output.

Subsequently, this processing is repeated. Specifically, upon the generation of the second-time timer interrupt (2), the third-time flow rate operation period Tx(3) starts. In the flow rate operation processing task 19, the flow rate operation is newly performed. When the flow rate operation during the third-time flow rate operation period Tx(3) is completed, the third-time timer interrupt (3) is generated. At this stage, the pulse output, which is transmitted during the pulse output transmission time t2 as described above, is not completed, and hence the operation result of the flow rate operation during the third-time flow rate operation period Tx(3) is temporarily stored in the pulse output processing task 20.

Upon the end of the second-time pulse output which is transmitted during the pulse output transmission time t2, the operation result of the flow rate operation during the third-time flow rate operation period Tx(3), which is temporarily stored, is converted into a pulse signal in the pulse output processing task 20, and is transmitted as a third-time pulse output during a pulse output transmission time t3. The third-time pulse output is transmitted continuously without containing any intermittent period with respect to the second-time pulse output.

Upon the generation of the third-time timer interrupt (3), a fourth-time flow rate operation period Tx(4) starts. The flow rate operation is newly performed in the flow rate operation processing task 19. When the flow rate operation during the fourth-time flow rate operation period Tx(4) is completed, a fourth-time timer interrupt (4) is generated. At this stage, the pulse output which is transmitted during the pulse output transmission time t3 as described above has not been completed yet. Accordingly, the operation result of the flow rate operation during the fourth-time flow rate operation period Tx(4) is temporarily stored in the pulse output processing task 20.

Upon the end of the third-time pulse output which is transmitted during the pulse output transmission time t3, the operation result of the flow rate operation during the fourth-time flow rate operation period Tx(4), which is temporarily stored, is converted into a pulse signal in the pulse output processing task 20, and is transmitted as a fourth-time pulse output during a pulse output transmission time t4. The fourth-time pulse output is transmitted continuously without containing any intermittent period with respect to the third-time pulse output. Note that the pulse output is repeated until the Coriolis flowmeter 11 is powered OFF.

Here, a description is made of a pulse output transmission time Tn (n: 1, 2, 3, . . . ). The pulse output transmission time Tn is defined by an expression having such a relation as Tn=Tx(1±θ). In this expression, the pulse output transmission time Tn includes θ so that a periodic variation of the flow rate operation period Tx can be taken into account. θ is set as, for example, θ≈1% (this is one example. θ may be set to an arbitrary percentage).

The pulse output transmission time t1 associated with the first-time pulse output is set to, for example, t1=Tx(1−θ). Then, in the process of determining the next pulse output transmission time t2, when the first-time pulse output is completed, a comparison is instantaneously made between the pulse output transmission time t1 associated with the first-time pulse output and the second-time flow rate operation period Tx(2), and an optimum transmission time for the next pulse output transmission time t2 is selected. This comparison/selection is performed by the CPU 18 (performed as one of processing in pulse output processing task 20).

To give a specific description, when the pulse output transmission time t1 is equal to or larger than the second-time flow rate operation period Tx(2) (t1≧Tx(2)), the next pulse output transmission time t2 is selected as a transmission time satisfying t2=Tx(1−θ). On the other hand, when the pulse output transmission time t1 is smaller than the second-time flow rate operation period Tx(2) (t1<Tx(2)), the next pulse output transmission time t2 is selected as a transmission time satisfying t2=Tx(1+θ).

Similarly, in the process of determining the next pulse output transmission time t3, when the second-time pulse output is ended, a comparison is instantaneously made between the pulse output transmission time t2 associated with the second-time pulse output and the third-time flow rate operation period Tx(3), and an optimum transmission time for the next pulse output transmission time t3 is selected. Specifically, when the pulse output transmission time t2 is equal to or larger than the third-time flow rate operation period Tx(3) (t2≧Tx(3)), the next pulse output transmission time t3 is selected as a transmission time satisfying t3=Tx(1−θ). On the other hand, when the pulse output transmission time t2 is smaller than the third-time flow rate operation period Tx(3) (t2<Tx(3)), the next pulse output transmission time t3 is selected as a transmission time satisfying t3=Tx(1+θ).

With regard to the pulse output transmission time Tn, a general expression therefor is expressed as follows. When the pulse output transmission time tn is equal to or larger than the corresponding flow rate operation period Tx (tn≧Tx), the next pulse output transmission time tn+1 is selected as a transmission time satisfying tn+1=Tx(1−θ). On the other hand, when the pulse output transmission time tn is smaller than the corresponding flow rate operation period Tx (tn<Tx), the next pulse output transmission time tn+1 is selected as a transmission time satisfying tn+1=Tx(130 θ). To give a supplementary description, when the pulse signals are output/transmitted in the above-mentioned manner, differences of ±θ% occur among the pulse output transmission times tn which are each specified with respect to one particular flow rate operation period Tx. However, considering that ϵ=0.5%, periodic variations of up to {(θ+ϵ)/θ} occur among the flow rate operation periods Tx, too. If a value near ϵ is adopted for θ, the variations can be suppressed within about two periods. As a result, it becomes possible to reduce dispersion of short-batch measurements which are conducted in a short period of time.

As described above, the pulse outputs are continuously transmitted without containing any intermittent period. In other words, the pulse outputs are transmitted as a pulse train having time-series continuity. With this configuration, a period measurement or a short-batch measurement can be conducted using the pulse outputs. Errors in counting of the number of the pulse outputs do not occur, thereby obtaining accurate outputs.

Figure 3:
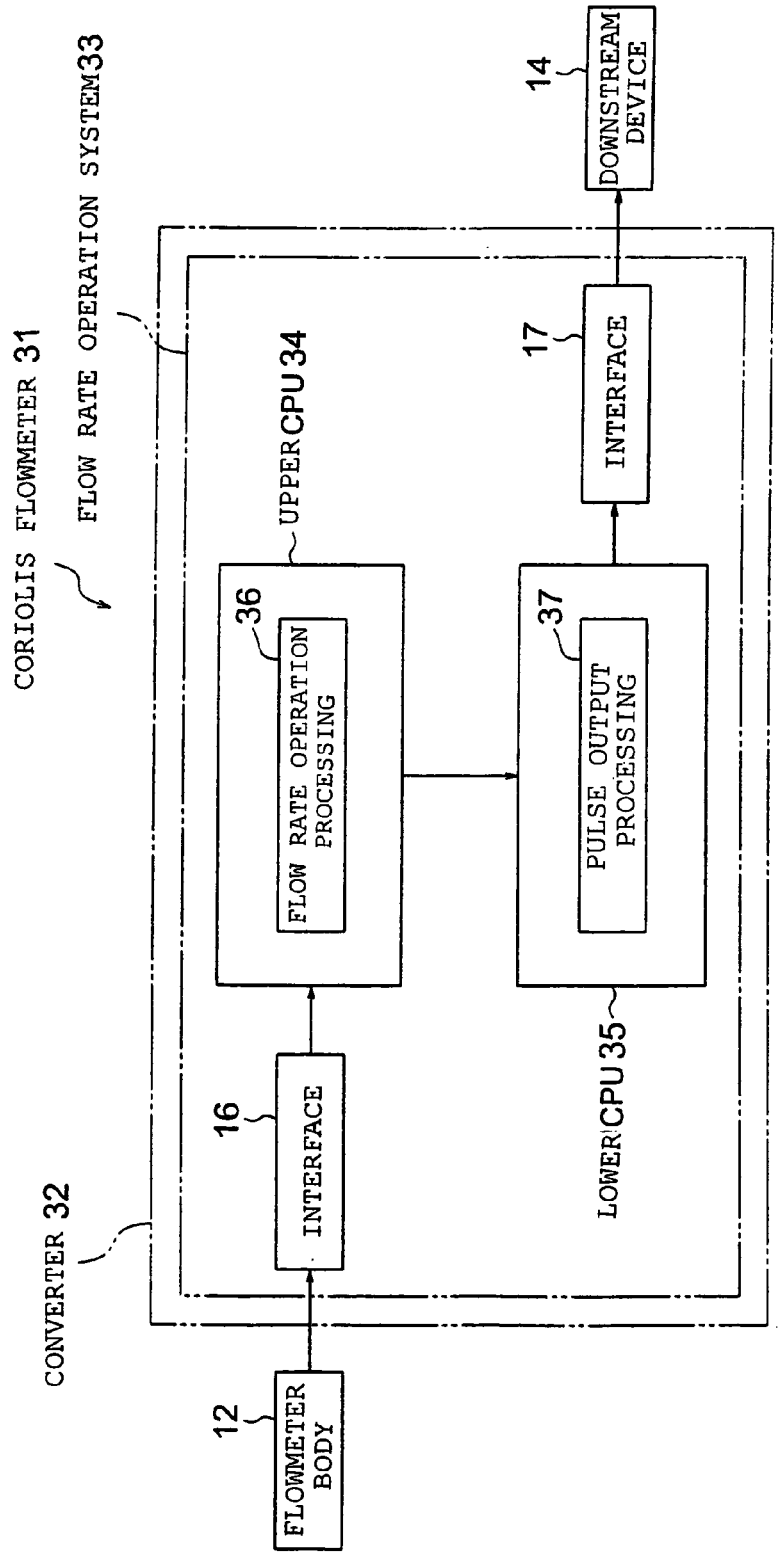
FIG. 3 is a configuration diagram illustrating a processing method for an operation system according to another embodiment (second embodiment) of the present invention.
Figure 4:
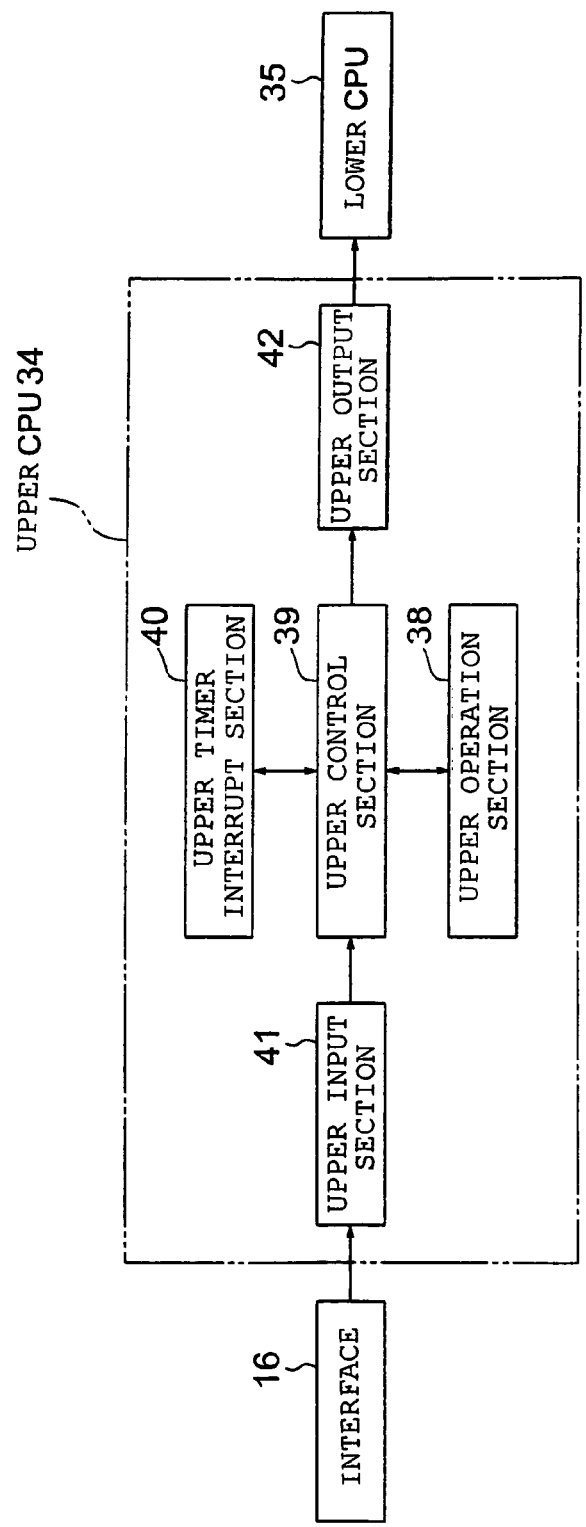
FIG. 4 is a diagram illustrating a configuration of an upper CPU.
Figure 5:
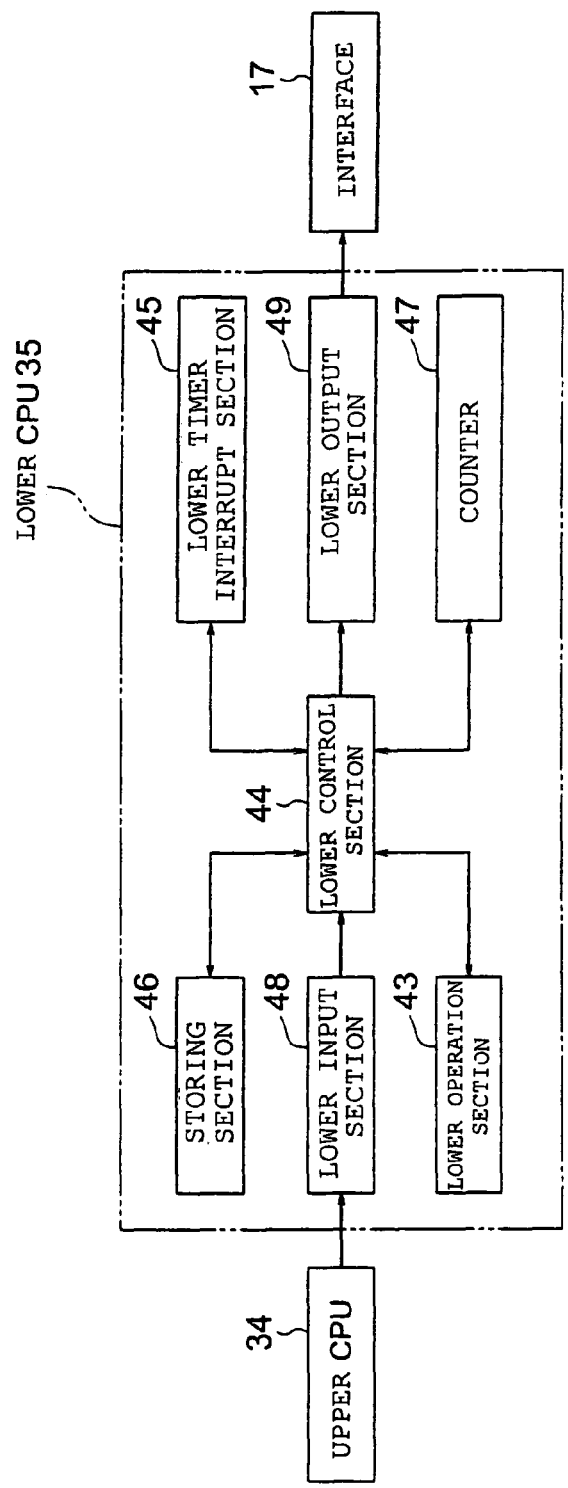
FIG. 5 is a diagram illustrating a configuration of a lower CPU.
Figure 6:
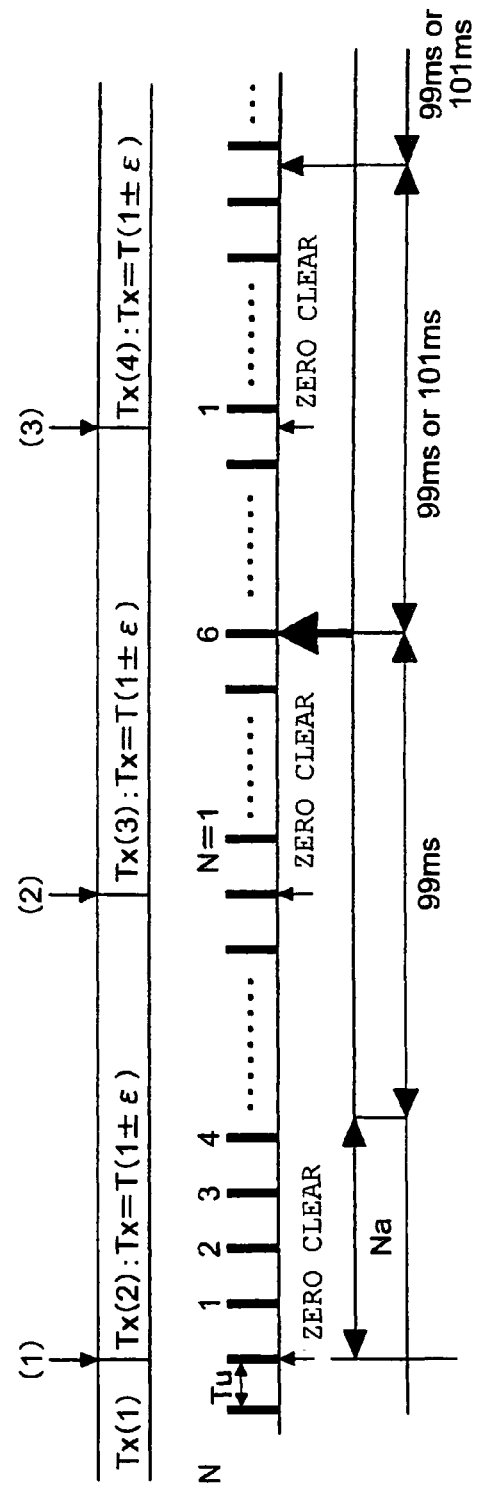
FIG. 6 is a control explanatory diagram illustrating control of a flow rate operation system.
Figure 7:
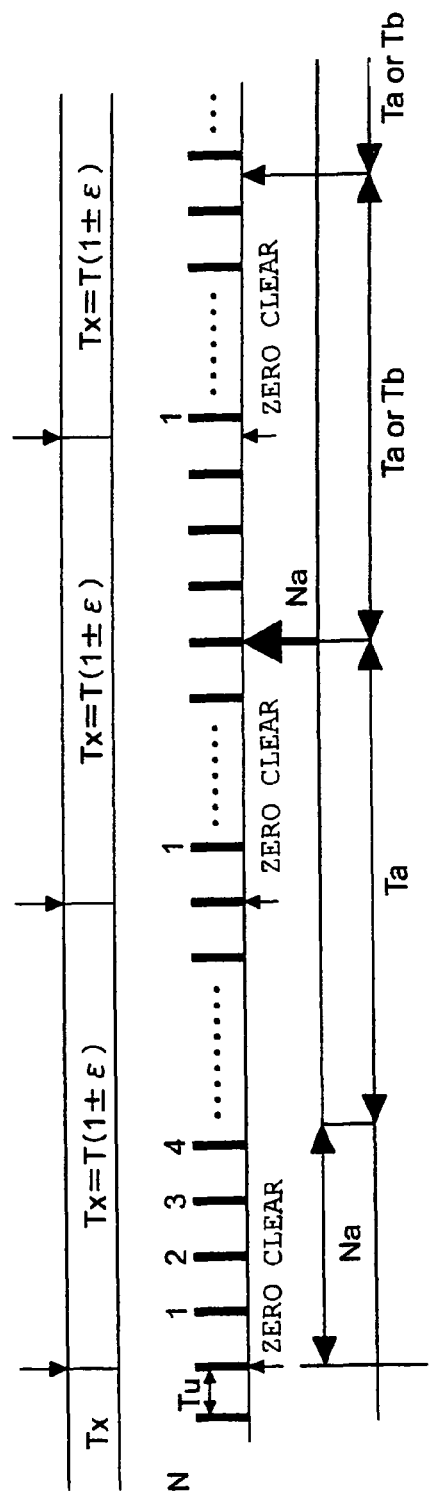
FIG. 7 is another control explanatory diagram illustrating the control of the flow rate operation system.

FIG. 3 is a configuration diagram illustrating a processing method for an operation system according to another embodiment (second embodiment) of the present invention. Further, FIG. 4 is a diagram illustrating a configuration of an upper CPU; FIG. 5 is a diagram illustrating a configuration of a lower CPU; and FIGS. 6 and 7 are control explanatory diagrams illustrating control of a flow rate operation system.

Referring to FIG. 3, a Coriolis flowmeter 31 includes the flowmeter body 12, which is publicly well-known, and a converter 32, which is related to the present invention. The Coriolis flowmeter 31 is connected to the downstream device 14 via the converter 32, and is configured to output/transmit a pulse signal to the downstream device 14. Note that, as in the first embodiment described above, in a case where the downstream device 14 is, for example, a display device, the downstream device 14 as the display device may be included in the configuration of the Coriolis flowmeter 31 by integrating into the converter 32.

The converter 32 includes a flow rate operation system 33 (with regard to other configurations which have general functions, illustrations and descriptions thereof are omitted). The flow rate operation system 33 includes the interfaces 16 and 17, an upper CPU 34, and a lower CPU 35 (two processing devices). The flowmeter body 12 is connected to the interface 16. On the other hand, the downstream device 14 is connected to the interface 17.

Referring to FIGS. 3 to 5, the upper CPU 34 and the lower CPU 35 are provided as portions responsible for operation, control, and judgment. The upper CPU 34 is so configured that a detection value (detection amount) from the flowmeter body (detection means) 12 is input via the interface 16. The upper CPU 34 is provided as upstream operation means for performing flow rate operation processing (operation processing) 36. The upper CPU 34 is so configured as to output an operation result from the flow rate operation processing 36 to the lower CPU 35 as flow rate data (operation detection value data).

The lower CPU 35 is provided as downstream operation means for performing pulse output processing 37 in which the flow rate data from the upper CPU 34 is converted into a pulse signal and is then output/transmitted. The pulse signal is output/transmitted via the interface 17.

For performing the flow rate operation processing 36, the upper CPU 34 includes an upper operation section 38, an upper control section 39, an upper timer interrupt section 40, an upper input section 41, and an upper output section 42. The upper input section 41 is connected to the interface 16. Further, the upper output section 42 is connected to the lower CPU 35. The upper control section 39 is connected to the upper input section 41. The upper operation section 38, the upper timer interrupt section 40, and the upper output section 42 are each connected to the upper control section 39.

The upper timer interrupt section 40 is so configured that, every time the flow rate operation in the flow rate operation processing 36 is completed, a timer interrupt is generated. In FIG. 6, the timer interrupts are indicated by the downward arrows. The timer interrupt serves as a flow rate operation completion interrupt. A generation period for such a timer interrupt corresponds to a flow rate operation period of the flow rate operation processing 36. The flow rate operation period is denoted by Tx in FIG. 6. The flow rate operation period Tx is defined by an expression having such a relation as $Tx=T(1\pm\epsilon)$. In this expression, T denotes a reference period, and $\epsilon$ denotes a periodic variation. Here, it is assumed that the reference period T is set to, for example, 100 ms whereas the periodic variation $\epsilon$ is set as, for example, $\epsilon \approx 0.5\%$ (this is one example. Smaller $\epsilon$ is more preferable).

For performing the pulse output processing 37, the lower CPU 35 includes a lower operation section 43, a lower control section 44, a lower timer interrupt section 45, a storing section 46, a counter 47, a lower input section 48, and a lower output section 49. The lower output section 49 is connected to the interface 17. Further, the lower input section 48 is connected to the upper CPU 34. The lower control section 44 is connected to the lower input section 48. The lower operation section 43, the lower timer interrupt section 45, the storing section 46, the counter 47, and the lower output section 49 are each connected to the lower control section 44.

The lower timer interrupt section 45 is so configured as to generate a timer interrupt with a sufficiently shorter period compared with a period of the timer interrupt generated by the upper timer interrupt section 40 of the upper CPU 34. The timer interrupt generated by the lower timer interrupt section 45 is set in such a manner as to be generated in asynchronization with the timer interrupt generated by the upper timer interrupt section 40. Here, assuming that the period of the timer interrupt generated by the lower timer interrupt section 45, that is, a lower timer interrupt period is Tu, the lower timer interrupt period Tu is set to 12.5 ms, which is about one eighth of the flow rate operation period Tx (reference period T is 100 ms) of the upper CPU 34 (this is one example. It is preferable that the lower timer interrupt period Tu be set using 1/n in which n is an integer equal to or larger than 2).

The counter 47 is provided for counting, in accordance with a predetermined rule, the number of generations of the timer interrupts which are generated for every lower timer interrupt period Tu. The counter 47 is so set that, every time the timer interrupt by the upper timer interrupt section 40 of the upper CPU 34 is generated, a zero clear (0 reset) is applied (this is the predetermined rule). As illustrated in FIG. 6, the counter 47 is set to start counting from the beginning after the zero clear.

In this example, a count value N of the counter 47 is set as follows. Specifically, the reference period T is set to 100 ms and the lower timer interrupt period Tu is set to 12.5 ms, and hence, taking into account the periodic variation $\epsilon$ of the flow rate operation period Tx, the count value N becomes 7 or 8. Here, as one example, a value (6) when the count value N is 6 is set as a predetermined interrupt count Na (Na=6). The predetermined interrupt count Na (Na=6) is described later.

In FIG. 6, "(1)" specifying one of the timer interrupt arrows indicates an upper timer interrupt which is generated for the first time after the initialization, that is, a first-time upper timer interrupt. Further, a timer interrupt specified by "(2)" indicates a second-time upper timer interrupt which is generated after the flow rate operation period Tx has elapsed. Similarly, "(3)" indicates a third-time timer interrupt, . . . .

In addition to that, Tx(1) of FIG. 6 indicates a first-time flow rate operation period, which is the first period after the initialization of the system. Further, Tx(2) indicates a second-time flow rate operation period, Tx(3) indicates a third-time flow rate operation period, . . . . Here, an operation result (Qm) obtained through the flow rate operation during the first-time flow rate operation period Tx(1) is a result obtained immediately after the initialization of the system, and hence it is assumed, for the sake of convenience, that an unstable operation result is contained therein (in actuality, the result is not necessarily unstable. The assumption is made only for the sake of convenience. It is assumed that the operation result becomes stable without fail before the second-time flow rate operation period Tx(2)). The flow rate operation period Tx and generation of the upper timer interrupt are repeated until the Coriolis flowmeter 31 is powered OFF (the lower timer interrupt period Tu is also repeated).

In the flow rate operation system 33, after the system is powered ON and the initialization of the system is completed, the flow rate operation is performed in the upper operation section 38 of the upper CPU 34 in accordance with an input of a detection value from the flowmeter body 12. In other words, the flow rate operation processing 36 is performed by the upper CPU 34.

First, the flow rate operation is performed during the first-time flow rate operation period Tx(1), and, upon the completion of this operation, the first-time upper timer interrupt (1) is generated. On this occasion, the operation result from the flow rate operation processing 36 of the upper CPU 34 is not immediately transmitted as a pulse output to the downstream device 14 by the pulse output processing 37 of the lower CPU 35. Instead, the operation result is transmitted as the pulse output when the count value N of the counter 47 has reached the predetermined interrupt count Na (Na=6) after the generation of the first-time upper timer interrupt (1). A pulse signal which is output when the count value N of the counter 47 is 6 is a first-time pulse output, and is transmitted during a pulse output transmission time of 99 ms (the pulse output transmission time of 99 ms and the like are described later).

When the first-time upper timer interrupt (1) is generated, the counter 47, which counts the number of generations of the timer interrupts generated for every lower timer interrupt period Tu (=12.5 ms), is zero-cleared (0-reset), and then starts counting from the beginning. Subsequently, when the count value N has become 6, which is equal to the predetermined interrupt count Na, in accordance with control from the lower control section 44 of the lower CPU 35, the first-time pulse output is transmitted during the pulse output transmission time of 99 ms (described below).

As can be seen from the description, the pulse signal is output/transmitted in asynchronization with the upper timer interrupt. In other words, the pulse output is transmitted through such control as to make the pulse output asynchronous with the timing of the end of the flow rate operation.

According to the present invention, by setting the transmission of the pulse output to be asynchronous with the timing of the end of the flow rate operation (generation of upper timer interrupt), there is provided a feature (not shown) which actively separates a time slot during which operation processing associated with another load is performed with the end of the flow rate operation as a trigger from a time slot during which the transmission of the pulse output is performed in the pulse output processing 37.

Upon the generation of the first-time upper timer interrupt (1), the second-time flow rate operation period Tx(2) starts. The flow rate operation is newly performed in the flow rate operation processing 36 of the upper CPU 34. When the flow rate operation during the second-time flow rate operation period Tx(2) is completed, the second-time timer interrupt (2) is generated. At this stage, the pulse output which is transmitted during the pulse output transmission time of 99 ms as described above has not been completed yet because the pulse output is delayed by a time corresponding to the predetermined interrupt count Na from the generation of the first-time timer interrupt (1). Accordingly, the operation result of the flow rate operation during the second-time flow rate operation period Tx(2) is temporarily stored in the storing section 46 of the lower CPU 35. When the second-time timer interrupt (2) is generated, the counter 47 is zero-cleared (0-reset), and then starts counting from the beginning again.

The storing of the operation result is performed in the pulse output processing 37 of the lower CPU 35 after the second-time timer interrupt (2) is generated.

Upon the end of the first-time pulse output which is transmitted during the pulse output transmission time of 99 ms, the operation result of the flow rate operation during the second-time flow rate operation period Tx(2), which is temporarily stored as described above, is transmitted as a second-time pulse output in the pulse output processing 37. The second-time pulse output is transmitted using the following pulse output transmission time. Specifically, the second-time pulse output is transmitted during a pulse output transmission time of Tx(1±θ%).

With regard to the pulse output transmission time, the count value N of the counter 47 is checked by the lower control section 44 when the first-time pulse output is ended, whereby an optimum pulse output transmission time Tx(1±θ%) is set. To give a specific description (to make a description as simple as possible, here, it is assumed that the flow rate operation period Tx=the reference period T=100 ms. Further, it is assumed that θ=1%. The first-time pulse output is transmitted during the pulse output transmission time of 99 ms, and hence the count value N of the counter 47 becomes a value around 6), when the count value N of the counter 47 is equal to or larger than 6, a second-time pulse output transmission time is set to 99 ms. This is determined by Tx(1−1%)=100 ms×(1−0.01). On the other hand, when the count value N of the counter 47 is smaller than 6, the second-time pulse output transmission time is set to 101 ms. This is determined by Tx(1+1%)=100 ms×(1+0.01). Thus, there is provided a method in which a difference from the upper timer interrupt period is checked for every period, utilizing the lower timer interrupt.

The second-time pulse output has been in a waiting state for pulse output transmission, and hence the second-time pulse output is transmitted during the above-mentioned pulse output transmission time (99 ms or 101 ms) immediately after the end of the transmission of the first-time pulse output. The second-time pulse output is transmitted continuously without containing any intermittent period with respect to the first-time pulse output.

Subsequently, this processing is repeated. Specifically, upon the generation of the second-time timer interrupt (2), a third-time flow rate operation period Tx(3) starts. In addition, the counter 47 is zero-cleared (0-reset), and then starts counting from the beginning again. By the flow rate operation processing 36 of the upper CPU 34, the flow rate operation is newly performed. When the flow rate operation during the third-time flow rate operation period Tx(3) is completed, a third-time timer interrupt (3) is generated. At this stage, because the pulse output, which is transmitted during the pulse output transmission time of 99 ms or 101 ms as described above, is not ended, the operation result of the flow rate operation during the third-time flow rate operation period Tx(3) is subjected to predetermined conversion and calculation by the pulse output processing 37 of the lower CPU 35, and then is temporarily stored.

Upon the end of the second-time pulse output which is transmitted during the pulse output transmission time of 99 ms or 101 ms, the operation result during the third-time flow rate operation period Tx(3), which is temporarily stored, is transmitted as a third-time pulse output during the pulse output transmission time of 99 ms or 101 ms. The third-time pulse output is transmitted continuously without containing any intermittent period with respect to the second-time pulse output.

Upon the generation of the third-time timer interrupt (3), a fourth-time flow rate operation period Tx(4) starts. In addition, the counter 47 is zero-cleared (0-reset), and then starts counting from the beginning again. By the flow rate operation processing 36 of the upper CPU 34, the flow rate operation is newly performed. When the flow rate operation during the fourth-time flow rate operation period Tx(4) is completed, a fourth-time timer interrupt (4) is generated though not shown. At this stage, because the pulse output, which is transmitted during the pulse output transmission time of 99 ms or 101 ms as described above, is not ended, the operation result of the flow rate operation during the fourth-time flow rate operation period Tx(4) is subjected to the predetermined conversion and calculation by the pulse output processing 37 of the lower CPU 35, and then is temporarily stored.

Upon the end of the third-time pulse output which is transmitted during the pulse output transmission time of 99 ms or 101 ms, the operation result during the fourth-time flow rate operation period Tx(4), which is temporarily stored, is transmitted as a fourth-time pulse output during the pulse output transmission time of 99 ms or 101 ms (not shown). The fourth-time pulse output is transmitted continuously without containing any intermittent period with respect to the third-time pulse output. The pulse output is repeated until the Coriolis flowmeter 31 is powered OFF.

The description made thus far is summarized as follows (see FIG. 7). Here, with respect to the flow rate operation period defined as $Tx=T(1\pm\epsilon)$, a phase time for starting the pulse output is set using the predetermined interrupt count Na. The pulse output transmission time Tn and the lower timer interrupt period are defined as $Tn=Tx(1\pm\theta)$ and Tu, respectively. The number of generations of the lower timer interrupt periods Tu during the flow rate operation period Tx when the transmission of the pulse output is completed is denoted by N (count value of counter 47).

(1) When the system is powered ON and the initialization of the system is completed, the flow rate operation period Tx is generated. During the flow rate operation period Tx, the number of the lower timer interrupt periods Tu is counted (the count of the lower timer interrupt periods Tu is zero-cleared upon the start of the next flow rate operation period Tx).

(2) The predetermined interrupt count Na (integer), which corresponds to the phase time for starting the pulse output, is set. Further, upon reception of an interrupt for the flow rate operation period Tx, the operation result (Qm) during this flow rate operation period Tx is temporarily stored for a time delay. After that, the first-time pulse output transmission time Ta (see definition below) is set, and processing for the first-time pulse output is executed. In the processing for the pulse output, in accordance with the pulse output transmission time Ta and the operation result which is previously obtained and temporarily stored, a pulse number, a pulse width, and the like, which are necessary for the conversion into the pulse signal and the transmission of the pulse output, are calculated, and then, the pulse signal is output/transmitted.

(3) When the transmission of the first-time pulse output is completed, in accordance with the count value N of the counter 47, the next pulse output transmission time to be the second-time pulse output is set using Ta or Tb, which are defined as follows. Assuming that $1 \leq Na \leq (Tx/Tu-1)$:

when $N \geq Na$, $Ta=Tx(1-\theta\%)$
when $N < Na$, $Tb=Tx(1+\theta\%)$.

(4) In accordance with the pulse output transmission time Ta or Tb, which serves as the set period, and the operation result (Qm) which is previously obtained and temporarily stored, a pulse number, a pulse width, and the like, which are necessary for the conversion into the pulse signal and the transmission of the pulse output, are calculated, and then, the pulse signal is output/transmitted.

(5) When the transmission of the pulse output is completed, in accordance with the count value N of the counter 47, the next pulse output transmission time is set to Ta or Tb. Subsequently, similar processing is repeated.

As described above, the pulse outputs are continuously transmitted without containing any intermittent period. In other words, the pulse outputs are transmitted as a pulse train having time-series continuity. With this configuration, a period measurement or a short-batch measurement can be conducted using the pulse outputs. Errors in counting the number of the pulse outputs do not occur, thereby obtaining accurate outputs.

Next, referring to FIGS. 8 to 14, a description is made of another example concerning an action of the flow rate operation system 33 according to the second embodiment described above. Here, the configuration of the flow rate operation system itself is fundamentally the same as in the above-mentioned description, and hence the description of the configuration is omitted. If necessary, the drawings used for the description of the flow rate operation system 33 according to the second embodiment described above are referred to.

Figure 8:
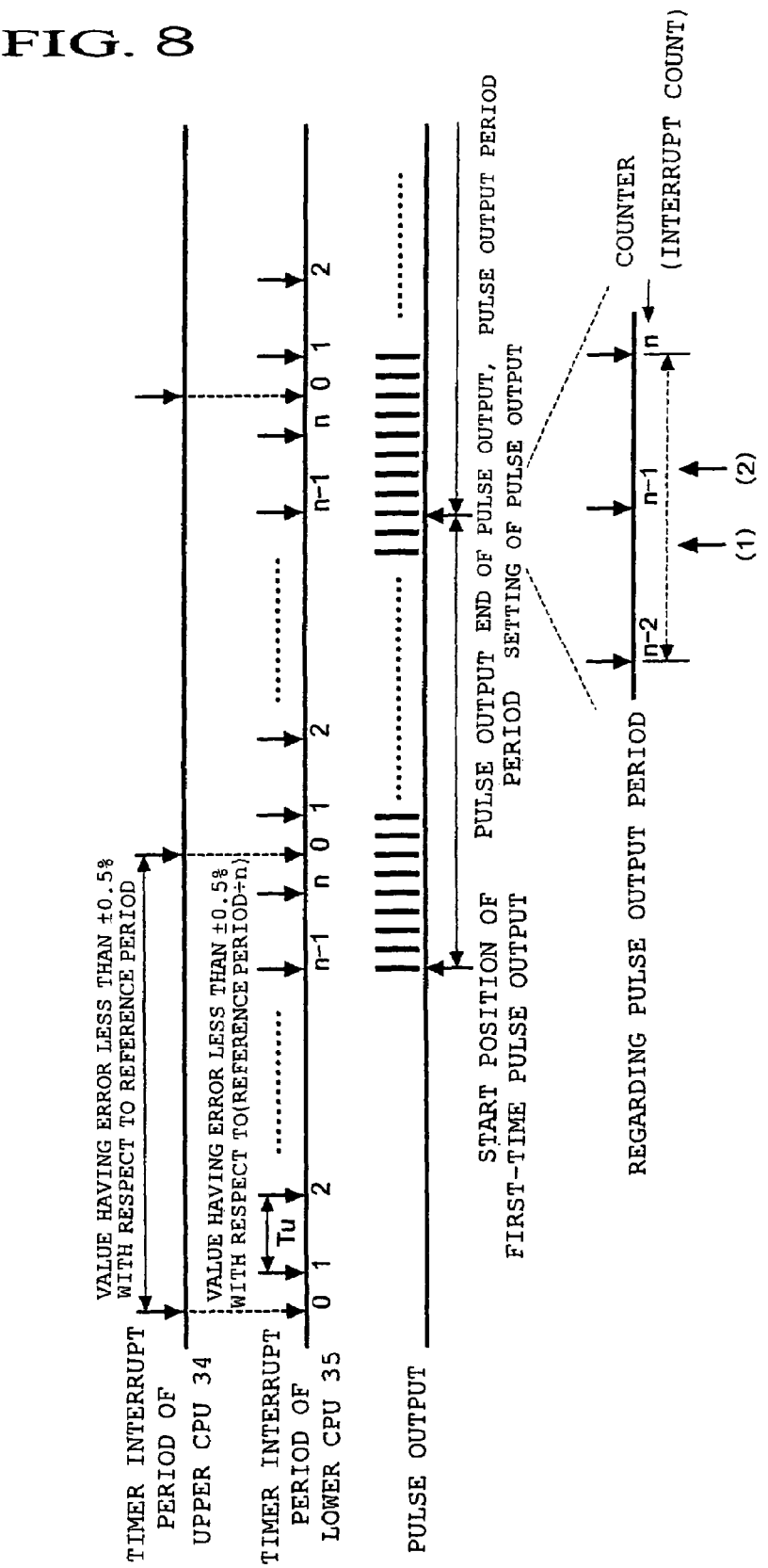
FIG. 8 is a control explanatory diagram of a flow rate operation system according to another example.
Figure 9:
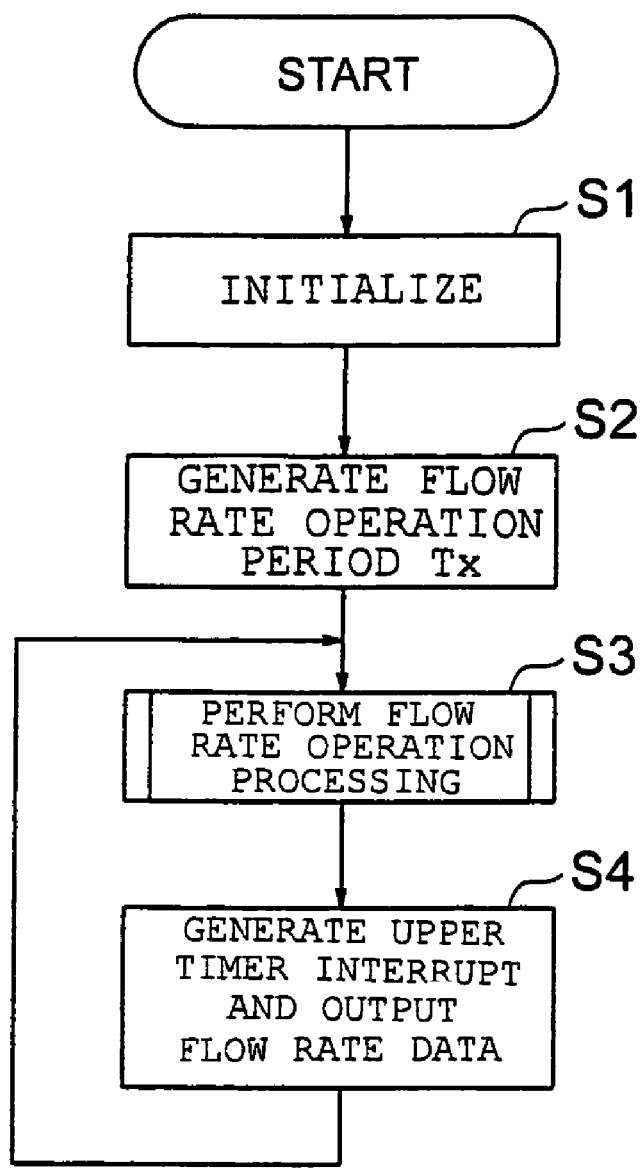
FIG. 9 is a flow chart relating to control of the upper CPU of the flow rate operation system according to the example in FIG. 8.

FIG. 8 is a control explanatory diagram of the flow rate operation system according to the another example. Further, FIG. 9 is a flow chart relating to control of the upper CPU of the flow rate operation system according to the another example, and FIGS. 10 to 14 are flow charts relating to control of the lower CPU of the flow rate operation system according to the another example.

Referring to FIG. 8, in the left side of FIG. 8, "TIMER INTERRUPT PERIOD OF UPPER CPU 34", "TIMER INTERRUPT PERIOD OF LOWER CPU 35", and "PULSE OUTPUT" are described in descending order. Further, "REGARDING PULSE OUTPUT PERIOD" is described in the lower part of FIG. 8. FIG. 8 schematically illustrates a state in which pulse outputs are transmitted as a pulse train having time-series continuity by using the upper CPU 34 and the lower CPU 35.

The downward arrows in the "TIMER INTERRUPT PERIOD OF UPPER CPU 34" part indicate generation positions of the upper timer interrupts. Further, in the "TIMER INTERRUPT PERIOD OF UPPER CPU 34" part, the horizontal arrow representing a range indicates a flow rate operation period Tx. An error of the flow rate operation period Tx is so set that the flow rate operation period Tx falls within $T\pm0.5\%$ (T denotes the reference period). The upper CPU 34 is configured to generate the upper timer interrupts for starting the flow rate operation processing 36 with a fixed period.

The downward arrows in the "TIMER INTERRUPT PERIOD OF LOWER CPU 35" part indicate generation positions of the lower timer interrupts. Further, the dashed downward arrows indicate timings at which the count value of the counter 47 is zero-cleared in response to the generation of the upper timer interrupts. In the "TIMER INTERRUPT PERIOD OF LOWER CPU 35" part, the horizontal arrow representing a range indicates the lower timer interrupt period Tu. An error of the lower timer interrupt period Tu is so set that the lower timer interrupt period Tu falls within $(T/n)\pm0.5\%$ (T denotes the reference period). The lower CPU 35 is configured to perform operation for the pulse output (pulse number and pulse width) and perform the starting of the pulse output.

Referring to the "TIMER INTERRUPT PERIOD OF LOWER CPU 35" part, the count value of the counter 47 is zero-cleared at the position of the dashed downward arrow, and after that, every time the lower timer interrupt is generated, the counter 47 is incremented. Numbers placed under the downward arrows indicate the count values of the counter 47, and in this case, numbers 1, 2, . . . n−1, and n are used. After the zero clear, the counter 47 is incremented up to n. Then, upon the generation of the upper timer interrupt, the counter 47 is zero-cleared again. This processing is performed repeatedly.

The above-mentioned reference period T is assumed to be a fixed period. However, the upper CPU 34 and the lower CPU 35 are each assumed to have errors even though the reference period T is used for the setting thereof.

It is assumed that the timer interrupt of the upper CPU 34 is asynchronous with the timer interrupt of the lower CPU 35. Thus, the generation position of the upper timer interrupt and the generation position of the lower timer interrupt are different from each other (differences of the generation positions can be seen from the positions of the dashed downward arrows and the solid downward arrows).

The upward arrow on the left hand of the "PULSE OUTPUT" part indicates that the first-time pulse output is started at this position. On the other hand, the upward arrow on the right hand indicates, with this single arrow, a position at which the first-time pulse output is ended, a position at which the pulse output is set, and a position at which the second-time pulse output is started. The horizontal arrows representing a range in the "PULSE OUTPUT" part indicate the pulse output period. The pulse output period between the upward arrow on the left hand and the upward arrow on the right hand indicates a period associated with the first-time pulse output, whereas the pulse output period starting from the upward arrow on the right hand indicates a period associated with the second-time pulse output.

The starting position of the pulse output employs as a reference a position when the count value of the counter 47 is n−1. The first-time pulse output is started when the count value of the counter 47 is n−1, and, for the second-time and subsequent pulse outputs, the pulse output periods are set in accordance with the count value at the time of the end of the pulse output.

With regard to the setting of the pulse output period, assuming that (n−2)≦count value≦n and 2≦n (n is an integer):

when count value≧(n−1), 99% of the reference period T is set when count value<(n−1), 101% of the reference period T is set.

To give a more specific description with regard to the setting of the pulse output period, the downward arrows in the "REGARDING PULSE OUTPUT PERIOD" part of FIG. 8 indicate the generation positions of the lower timer interrupts. The lower timer interrupts indicate the counter values of the counter 47, which are n−2, n−1, and n. In the "REGARDING PULSE OUTPUT PERIOD" part, the dashed horizontal arrow representing a range means that the pulse output is ended within this range. Upward arrows (1) and (2) of the "REGARDING PULSE OUTPUT PERIOD" part each indicate pulse output end positions.

In the "REGARDING PULSE OUTPUT PERIOD" part, when the pulse output end position is (1), the pulse output period is set to 101% of the reference period T. On the other hand, when the pulse output end position is (2), the pulse output period is set to 99% of the reference period T.

In addition, in FIG. 8, assuming that, if errors of the reference period T become smaller, a setting value of the pulse output period can be changed:

when count value≧(n−1), the ratio of the pulse output period is set as 99%≦ratio of pulse output period<100% when count value<(n−1), the ratio of the pulse output period is set as 101%≧ratio of pulse output period>100%.

Referring to FIGS. 8 to 14, a description is made of a specific control example of the flow rate operation system. When the Coriolis flowmeter 31 is powered ON, the flow rate operation system is initialized. Specifically, in the upper CPU 34, the initialization is performed in Step S1 illustrated in FIG. 9. On the other hand, in the lower CPU 35, the initialization is performed in Step S11 illustrated in FIG. 10. First, referring to FIGS. 8 and 9, a description is made of control of the upper CPU 34.

In Step S1, the initialization is performed. Next, in Step S2, based on the reference period T, the flow rate operation period Tx is generated (reference period T=100 ms), and then, the flow rate operation processing 36 is started using the flow rate operation period Tx (Step S3). Subsequently, when the flow rate operation processing 36 is completed, in Step S4, the upper timer interrupt is generated, and the flow rate data is output. When the generation of the upper timer interrupt and the output of the flow rate data are completed, the processing from Step S3 is repeated again. In the upper CPU 34, the upper timer interrupts are generated at the intervals of the flow rate operation period Tx, and in addition, the flow rate data is output to the lower CPU 35.

Figure 10:
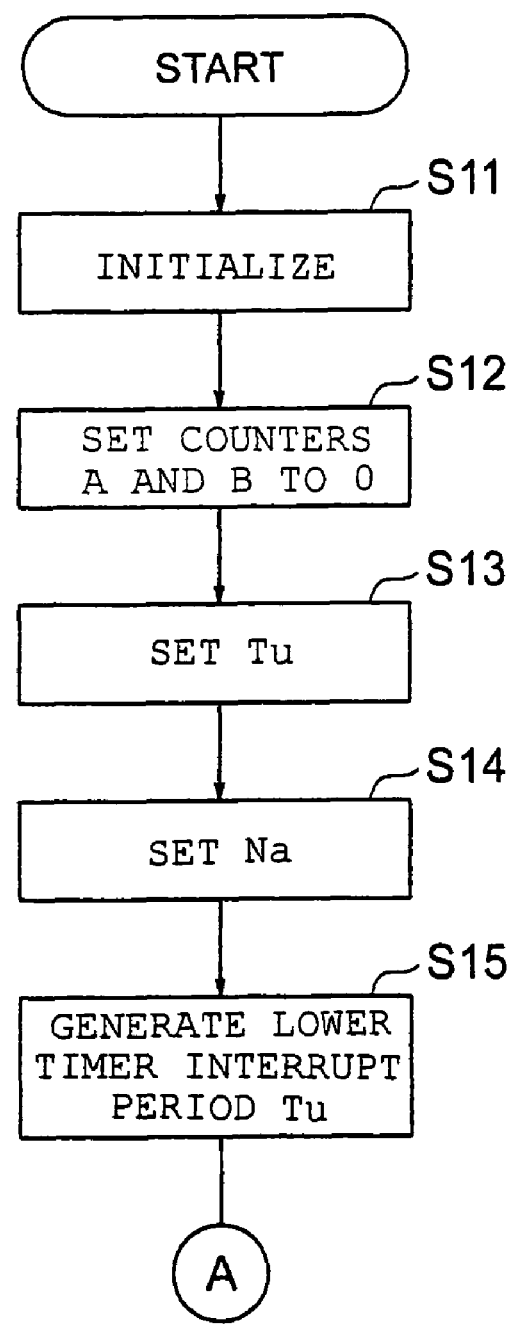
FIG. 10 is a flow chart relating to control of the lower CPU of the flow rate operation system according to the example in FIG. 8.

Referring to FIGS. 8 and 10, in the lower CPU 35, the initialization is performed in Step S11. Next, in Step S12, two counters A and B are initialized (zero-cleared). The counter A is a counter (corresponding to counter 47) which counts the number of generations of the lower timer interrupts of the lower CPU 35. The counter B is a counter for judging whether or not the first-time pulse signal has been output. Next, in Step S13, the lower timer interrupt period Tu is set. The lower timer interrupt period Tu is set as 1/n of the reference period T. Subsequently, in Step S14, the predetermined interrupt count Na is set (in this case, to n−1), and then, in Step S15, the lower timer interrupt period Tu is generated.

Figure 11:
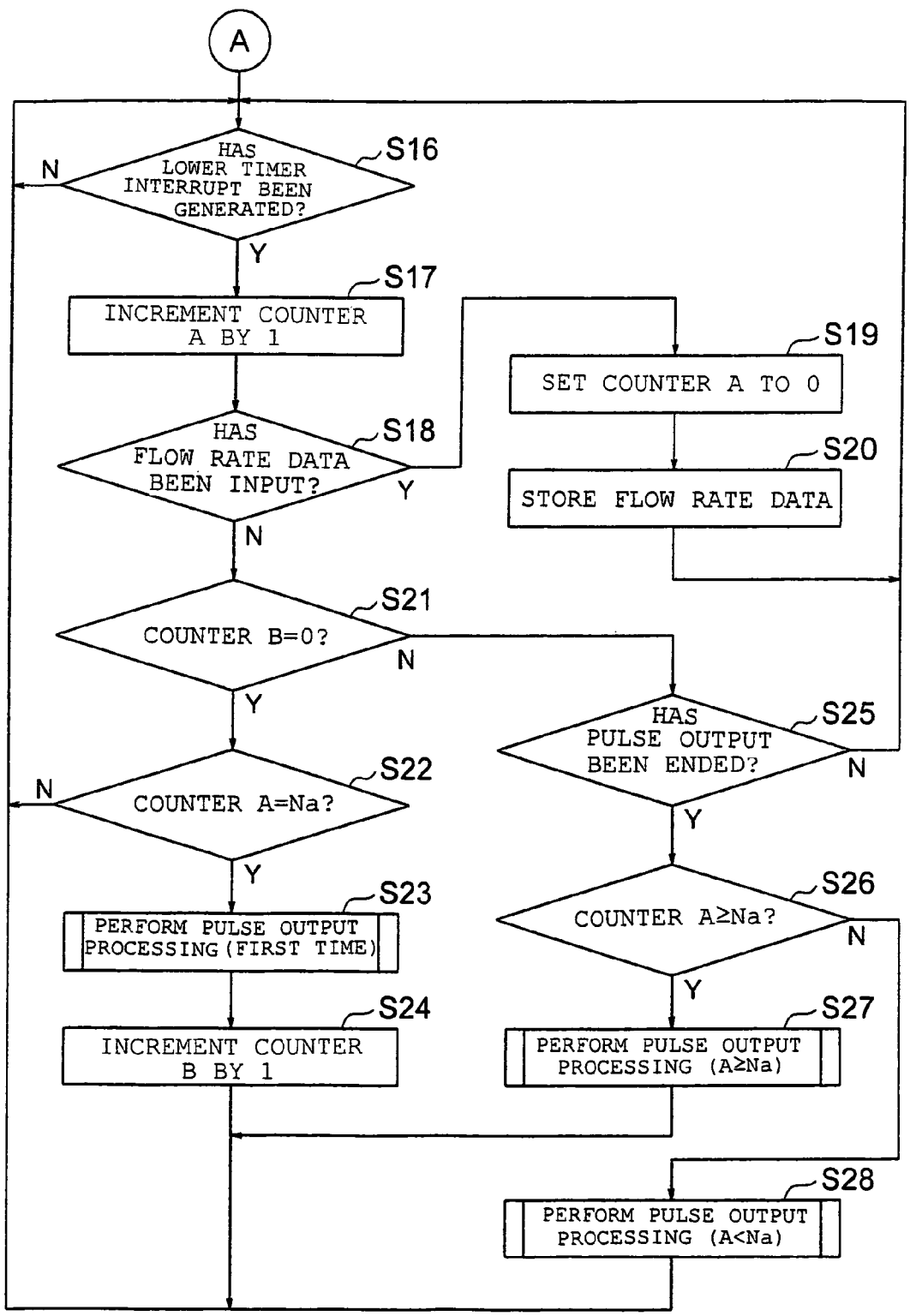
FIG. 11 is another flow chart relating to the control of the lower CPU of the flow rate operation system according to the another example.

Referring to FIGS. 8 and 11, next, in Step S16, it is judged whether or not the lower timer interrupt has been generated. Step S16 is repeated until the lower timer interrupt has been generated. When the lower timer interrupt has been generated (Y in Step S16), the counter A is incremented by one (+1) in next Step S17. Next, in Step S18, it is judged whether or not the flow rate data has been input from the upper CPU 34. In Step S18, when the flow rate data has been input (Y in Step S18), this means that the upper timer interrupt has been generated in the upper CPU 34. Therefore, the counter A is zero-cleared (0 is input to the counter A) in Step S19, and in Step S20, the input flow rate data is temporarily stored. Then, the processing from Step S16 is repeated again (when the processing from Step S16 is repeated again, the counter A is counted up).

When the flow rate data has not been input in Step S18 (N in Step S18), next, it is judged whether or not the count of the counter B is 0 (zero) in Step S21. When the count of the counter B is 0 (zero) (Y in Step S21), next, it is judged whether or not the count of the counter A is equal to the predetermined interrupt count Na in Step S22. When the count of the counter A is not equal to the predetermined interrupt count Na (N in Step S22), it is judged that the timing for the first-time pulse output has not come yet, and then, the processing from Step S16 is repeated again.

On the other hand, when the count of the counter A is equal to the predetermined interrupt count Na (Y in Step S22), that is, when the count of the counter A has been counted up to n−1 by repeating the processing from Step S16, the first-time pulse output is started by the pulse output processing (first time) 37 in Step S23. The pulse output processing (first time) 37 is processed through the following steps.

Figure 12:
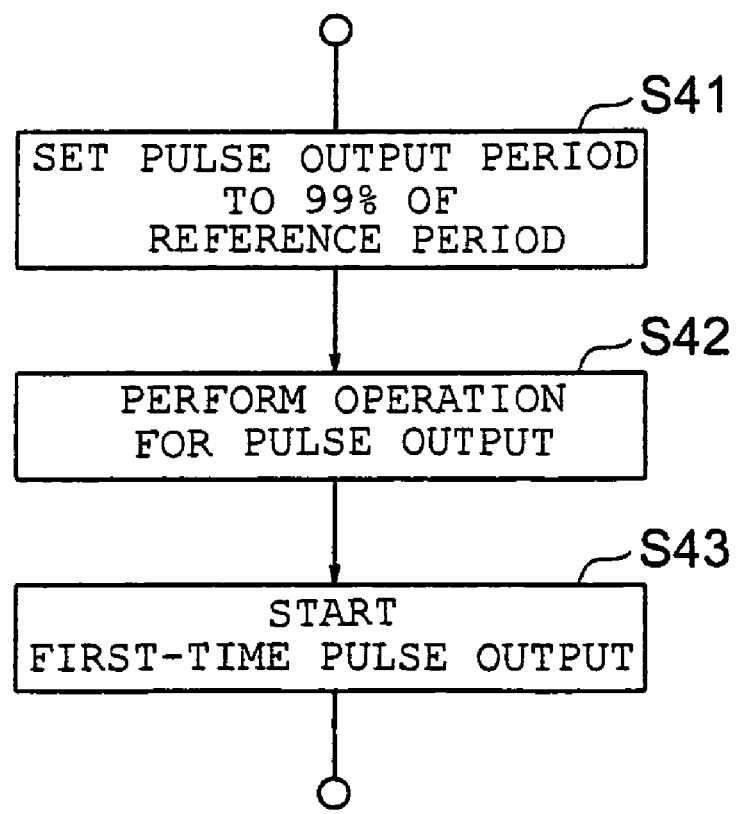
FIG. 12 is a flow chart relating to pulse output processing (first time).

Specifically, as illustrated in FIG. 12, the pulse output period is set as 99% of the reference period T in Step S41. Next, in Step S42, the operation (pulse number and pulse width) for the first-time pulse output is performed. Then, in Step S43, the first-time pulse output is started, and the processing proceeds to Step S24 of FIG. 11. As can be seen from FIG. 8, the first-time pulse output is output/transmitted with the timing of the lower CPU 35, which is independent of the timing of the upper CPU 34.

After the pulse output processing (first time) 37, the count of the counter B is incremented by one (+1) in Step S24. Note that, due to the count of the counter B being incremented, the processing of Steps S22 to S24 is not performed afterwards. This is because the first-time pulse output is started and the processing proceeds to the N-side branch of Step S21. When the count of the counter B is counted up, the processing from Step S16 is repeated again.

When it is judged that the count of the counter B is not 0 (zero) in Step S21 (N in Step S21), next, it is judged whether or not the pulse output has been ended in Step S25. In the description made thus far, only the first-time pulse output has been transmitted, and hence, at this point, it is judged whether or not the first-time pulse output has been ended. When the first-time pulse output has not been ended (N in Step S25), the processing from Step S16 is repeated again.

When it is judged that the pulse output has been ended in Step S25 (Y in Step S25), next, it is judged whether or not the count of the counter A is equal to or larger than the predetermined interrupt count Na in Step S26. When the count of the counter A is equal to or larger than the predetermined interrupt count Na (Y in Step S26), the pulse output processing (A≧Na) 37 is performed in Step S27, whereas when the count of the counter A is smaller than the predetermined interrupt count Na (N in Step S26), the pulse output processing (A<Na) 37 is performed in Step S28.

Figure 13:
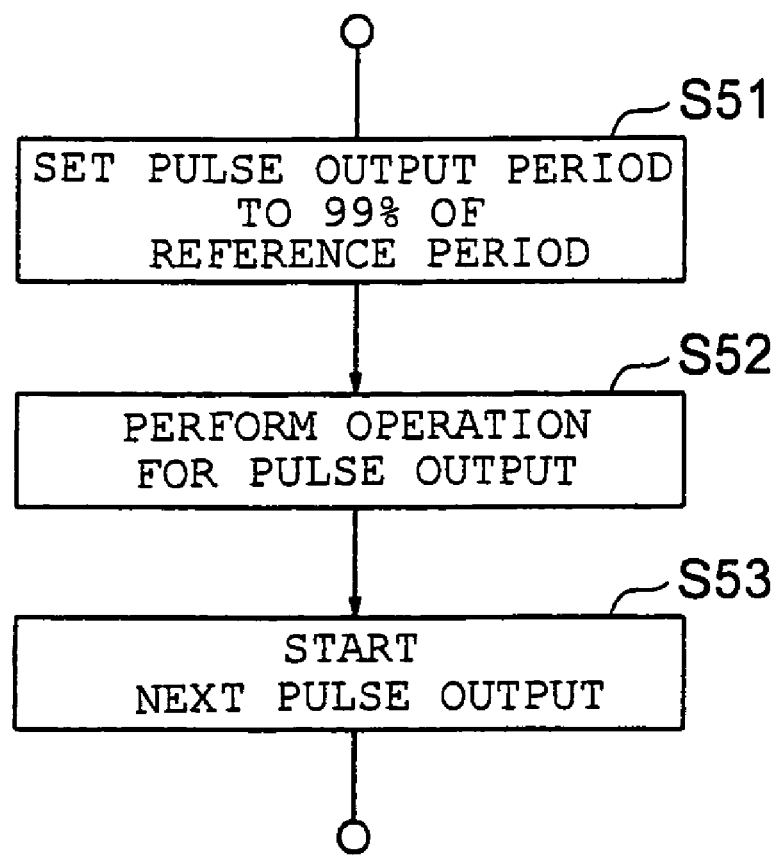
FIG. 13 is a flow chart relating to pulse output processing (A≧Na).

The pulse output processing (A≧Na) 37 is processed through the following steps. Specifically, as illustrated in FIG. 13, the next pulse output period is set as 99% of the reference period T in Step S51. In Step S52, the operation (pulse number and pulse width) for the next pulse output is performed. Then, in Step S53, the next pulse output is started, and the processing proceeds to Step S16 of FIG. 11. As can be seen from FIG. 8, the next pulse output is continuously transmitted without containing any intermittent period with respect to the first-time pulse output.

Figure 14:
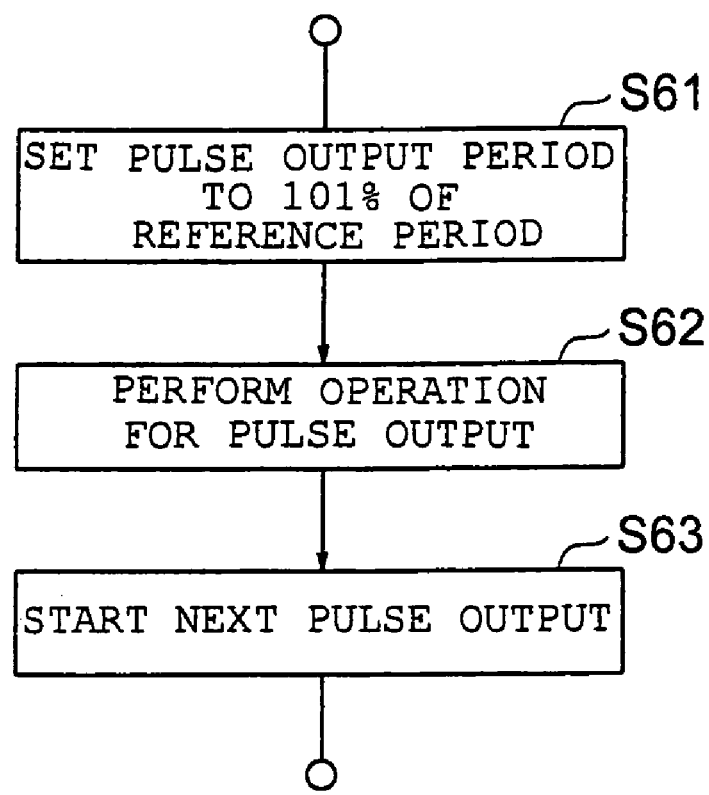
FIG. 14 is a flow chart relating to pulse output processing (A<Na).
Figure 15:
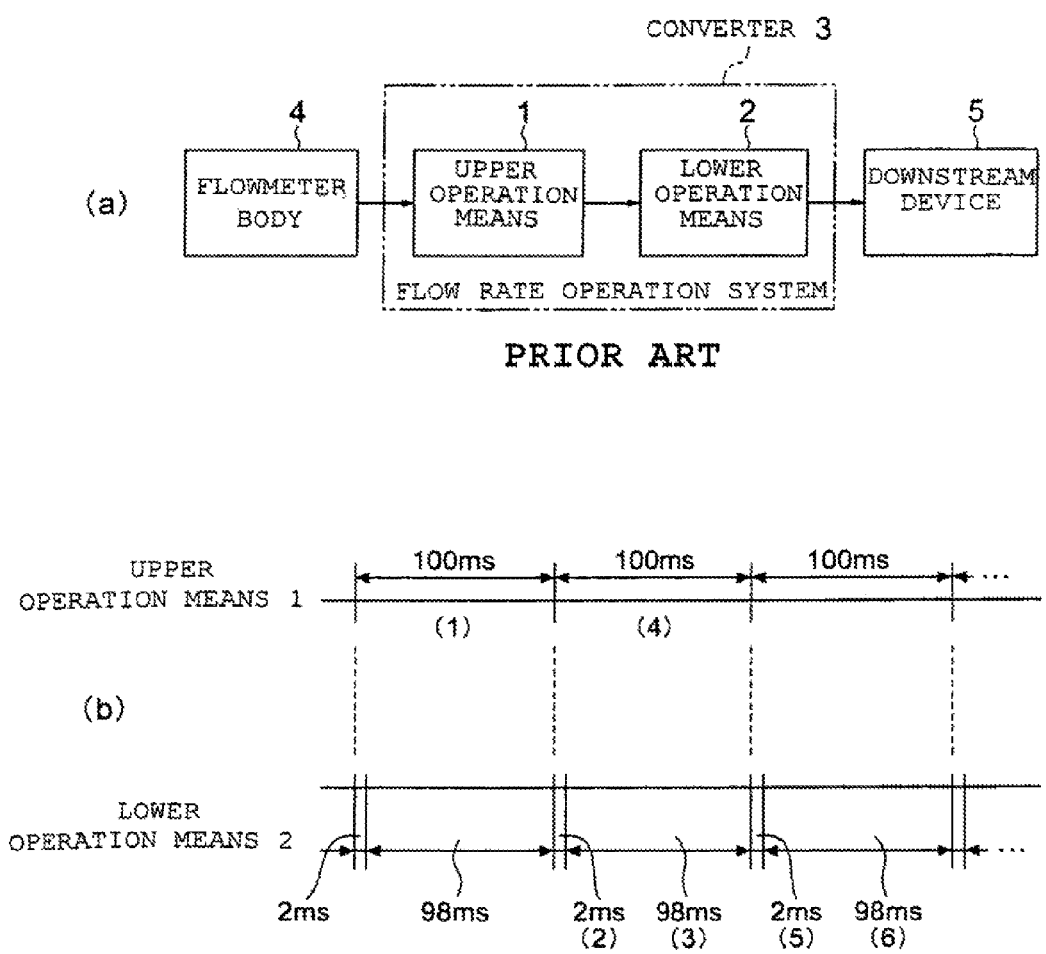
FIG. 15(a) is a configuration diagram of a flow rate operation system according to a conventional example.
FIG. 15(b) is its control explanatory diagram.

On the other hand, the pulse output processing (A<Na) 37 is processed through the following steps. Specifically, as illustrated in FIG. 14, the next pulse output period is set as 101% of the reference period T in Step S61. In Step S62, the operation (pulse number and pulse width) for the next pulse output is performed. Then, in Step S63, the next pulse output is started, and the processing proceeds to Step S16 of FIG. 11. As can be seen from FIG. 8, the next pulse output is continuously transmitted without containing any intermittent period with respect to the first-time pulse output.

When the second-time pulse output is started, the processing from Step S16 is repeated again. Specifically, in Step S16, it is judged whether or not the lower timer interrupt is generated. When the lower timer interrupt is generated (Y in Step S16), the counter A is incremented by one (+1) in next Step S17. Next, in Step S18, it is judged whether or not the flow rate data has been input from the upper CPU 34. When the flow rate data has been input in Step S18 (Y in Step S18), the counter A is zero-cleared in Step S19, and in Step S20, the input flow rate data is temporarily stored. Then, the processing from Step S16 is repeated again (when the processing from Step S16 is repeated again, the count of the counter A is counted up).

When the flow rate data has not been input in Step S18 (N in Step S18), next, it is judged whether or not the count of the counter B is 0 (zero) in Step S21. In this case, the first-time pulse output has been already completed, and hence it is judged that the count of the counter B is not 0 (zero) in Step S21 (N in Step S21). Next, in Step S25, it is judged whether or not the pulse output has been ended. When the pulse output has not been ended (N in Step S25), the processing from Step S16 is repeated again. Note that processing thereafter is omitted from the illustration of FIG. 8.

When it is judged that the pulse output has been ended in Step S25 (Y in Step S25), next, it is judged whether or not the count of the counter A is equal to or larger than the predetermined interrupt count Na in Step S26. When the count of the counter A is equal to or larger than the predetermined interrupt count Na (Y in Step S26), the pulse output processing (A≧Na) 37 is performed in Step S27, whereas when the count of the counter A is smaller than the predetermined interrupt count Na (N in Step S26), the pulse output processing (A<Na) 37 is performed in Step S28.

When the next pulse output is started by the pulse output processing (A≧Na) or the pulse output processing (A<Na), this pulse output is transmitted continuously without containing any intermittent period with respect to the pulse output immediately before this pulse output. When the next pulse output is started, the processing proceeds to Step S16 of FIG. 11, and the processing is repeated again. The pulse outputs are transmitted continuously without containing any intermittent period until the Coriolis flowmeter 31 is powered OFF.

As described above, the pulse outputs are transmitted continuously without containing any intermittent period. In other words, the pulse outputs are transmitted as a pulse train having time-series continuity. With this configuration, a period measurement or a short-batch measurement can be conducted using the pulse outputs. Errors in counting the number of the pulse outputs do not occur, thereby obtaining accurate outputs.

In addition, it is needless to say that various changes and modifications may be made without departing from the scope and gist of the present invention.

The invention claimed is:

1. A processing method for an operation system which performs operation processing in accordance with a detection amount detected by a detection means and pulse output processing in which an operation result from the operation processing is transmitted as a pulse output, comprising:
    controlling transmission of the pulse output performed in the pulse output processing to make the transmission of the pulse output asynchronous with a timing of an end of the operation processing;
    transmitting, by repeating said controlling, a pulse train having time-series continuity;
    comparing an operation period of the operation processing and a pulse output transmission time of the pulse output processing, which is associated with the operation period; and
    setting, in accordance with a result of the comparing, a next pulse output transmission time.

2. A processing method for an operation system according to claim 1, wherein:
    when the pulse output transmission time is larger than the operation period associated therewith as the result of the comparing, the next pulse output transmission time is set to be a time determined by subtracting θ% of the operation period from the operation period; and
    when the pulse output transmission time is smaller than the operation period associated therewith as the result of the comparing, the next pulse output transmission time is set to be a time determined by adding θ% of the operation period to the operation period.

3. A processing method for an operation system which performs operation processing in accordance with a detection amount detected by a detection means and pulse output processing in which an operation result from the operation processing is transmitted as a pulse output, comprising:

controlling transmission of the pulse output performed in the pulse output processing to cause the transmission of the pulse output to be asynchronous with a timing of an end of the operation processing;

transmitting, by repeating the controlling, a pulse train having time-series continuity;

generating upper timer interrupts in synchronization with an operation period of the operation processing;

generating, instead of using the operation period, lower timer interrupts at intervals of 1/n of the operation period, n being an integer equal to or larger than 2; and setting, in accordance with a number of generations of the lower timer interrupts after generation of one of the upper timer interrupts, a next pulse output transmission time in the pulse output processing.

4. A processing method for an operation system according to claim 3, wherein:

when the number of generations of the lower timer interrupts is larger than a predetermined integer, the next pulse output transmission time is set to be a time determined by subtracting θ% of the operation period from the operation period; and when the number of generations of the lower timer interrupts is smaller than the predetermined integer, the next pulse output transmission time is set to be a time determined by adding θ% of the operation period to the operation period.

5. A processing method for an operation system according to claim 1, wherein the operation processing and the pulse output processing are performed separately by using two processing devices.

6. A processing method for an operation system according to claim 2, wherein the operation processing and the pulse output processing are performed separately by using two processing devices.

7. A processing method for an operation system according to claim 3, wherein the operation processing and the pulse output processing are performed separately by using two processing devices.

8. A processing method for an operation system according to claim 4, wherein the operation processing and the pulse output processing are performed separately by using two processing devices.

9. A flow rate converter, which adopts, as a processing method for a flow rate operation system, the processing method for an operation system according to claim 1.

10. A flow rate converter, which adopts, as a processing method for a flow rate operation system, the processing method for an operation system according to claim 2.

11. A flow rate converter, which adopts, as a processing method for a flow rate operation system, the processing method for an operation system according to claim 3.

12. A flow rate converter, which adopts, as a processing method for a flow rate operation system, the processing method for an operation system according to claim 4.

13. A flow rate converter, which adopts, as a processing method for a flow rate operation system, the processing method for an operation system according to claim 5.

14. A flow rate converter, which adopts, as a processing method for a flow rate operation system, the processing method for an operation system according to claim 6.

15. A flow rate converter, which adopts, as a processing method for a flow rate operation system, the processing method for an operation system according to claim 7.

\* \* \* \* \*